United States Patent

[11] 3,617,582

| [72] | Inventors | Bernard Charles Lawes;<br>Owen Bertwell Mathre, both of<br>Wilmington, Del. |
|---|---|---|
| [21] | Appl. No. | 15,870 |
| [22] | Filed | Mar. 2, 1970 |
| [45] | Patented | Nov. 2, 1971 |
| [73] | Assignee | E. I. du Pont de Nemours and Company<br>Wilmington, Del. |

[54] PROCESS FOR DETOXIFYING CYANIDE WASTE WATERS
16 Claims, No Drawings

[52] U.S. Cl......................................................... 210/63,
23/84, 204/55
[51] Int. Cl......................................................... C02c 5/04
[50] Field of Search............................................ 23/75, 79,
84, 151; 210/50, 63, 59; 204/55

[56] References Cited
UNITED STATES PATENTS
3,510,424  5/1970  Zumbrunn....................  210/63
FOREIGN PATENTS
1,564,915  3/1969  France ........................  210/63
1,150,097  4/1969  Great Britain................  210/59
OTHER REFERENCES
Gurnham, C. F., Principles of Industrial Waste Treatment, 1955, John Wiley & Sons, N.Y., pp. 220 and 253 relied on (copy in Gp. 176)

Primary Examiner—Michael Rogers
Attorney—Robert W. Black

ABSTRACT: A process for detoxifying cyanide waste waters such as from cyanide electroplating rinse waters and chemical process waste waters is provided which allows the treated waste waters to be discharged to a sewer or to a solids separation step. The process uses a combination of hydrogen peroxide and formaldehyde in certain ratios and preferably a magnesium salt such as Epsom salt. Hydrogen peroxide is used in amounts so as to provide an initial molar ratio of $H_2O_2/CN^1$ within the range of 0.6 to 3, preferably 0.75 to 1.5 while the formaldehyde is used in amounts so as to provide an initial molar ratio of $CH_2O/CN^1$ within the range of 0.5 to 3, preferably 0,6 to 2. When the magnesium salt is used, it is used in an amount to provide at least about 0.3 p.p.m. of $Mg^{++}$, preferably about 0.3 to 100 p.p.m. of $Mg^{++}$. It is preferred that the temperature for carrying out the process be within the range of about 50° to 180° F. and the pH of the waste waters treated be within the range of about 9 to 12.5. When zinc cyanide electroplating rinse waters are treated, the settled or filtered basic zinc salts can be recycled to the zinc electroplating step. For the first time, the process of the present invention has brought economy and efficiency to the destruction of cyanide using peroxygen compounds without the need for a catalyst.

PROCESS FOR DETOXIFYING CYANIDE WASTE WATERS

BACKGROUND OF THE INVENTION

1. Field of the Invention

This invention relates to processes for detoxifying cyanide-containing waters and more particularly to processes for detoxifying cyanide-containing rinse waters from zinc cyanide electroplating processes using a combination of hydrogen peroxide, formaldehyde and a magnesium salt.

2. Prior Art

Chemical detoxification of cyanide-containing waste waters is presently accomplished commercially by the use of chlorine at a pH greater than 8, which is highly noxious, or by the use of an aqueous solution of sodium or calcium hypochlorite, which solutions are noxious, relatively expensive and have relatively limited shelf life. Also, unreacted chlorine or hypochlorite discharged to a sewer is a pollutant. It would be highly desirably to have a chemical system having the ease of feeding liquid hypochlorite, but having the lower cost of chlorine gas.

Early technical literature and French Pat. Nos. 1,560,450 and 1,564,915 show that hydrogen peroxide, and other peroxygen products, react to convert the cyanide radical to cyanate and other relatively innocuous products. However, deficiencies of hydrogen peroxide detoxification of cyanide are that the hydrogen peroxide is used inefficiently and that catalysis by a metal ion such as $Cu^{++}$ (itself a pollutant) is needed to give practical reaction times, but $Cu^{++}$ also catalyzes the decomposition of hydrogen peroxide, which makes cyanide destruction even less efficient.

British Pat. Nos. 474,449 and 1,150,096 show the treatment of cyanide waste waters by the use of a carbonyl compound. In the latter patent, carbonyl treatment is followed by air oxidation or acid hydrolysis to destroy a cyanohydrin intermediate. The carbonyl treatment is inefficient and too slow for commercial operation, especially in plating shops where treatment times of more than 2 hours for a batch destruction of cyanide wastes cannot be employed.

SUMMARY OF THE INVENTION

According to the present invention there is provided a process for detoxifying cyanide anions contained in water comprising: (1) forming a solution of the cyanide-containing water with hydrogen peroxide and formaldehyde, said hydrogen peroxide being present in an amount so as to provide an initial molar ratio of hydrogen peroxide to cyanide anions within the range of about 0.6 to 3 and said formaldehyde being present in an amount so as to provide an initial molar ratio of formaldehyde to cyanide anions within the range of about 0.5 to 3; (2) reacting said hydrogen peroxide and formaldehyde with said cyanide anions at a temperature within the range of about 50° to 180° F. and at a pH within the range of about 9 to 12.5 for a time sufficient to detoxify the cyanide anions; and (3) discharging the cyanide detoxified water.

There is also provided a preferred process wherein a magnesium compound is also employed as a treatment chemical, especially when zinc cyanide electroplating rinse waters are to be detoxified.

DETAILED DESCRIPTION OF THE INVENTION

While emphasis in the present invention is directed to the treatment of cyanide-containing rinse water from an aqueous cyanide zinc electroplating process, the process of the invention is applicable to a wide variety of cyanide-containing waters. Any aqueous stream containing cyanide anions ($CN^1$) can be treated, e.g., cyanide waste from other metal-finishing processes, such as cadmium electroplating, mining operations and chemical and steel plants, as long as any complex metal cyanides present dissociate to sodium cyanide for destruction. Not only can cyanide anions themselves be detoxified, but the process is also useful for detoxifying chemicals which are capable of releasing cyanide anions such as alpha cyanohydrins.

In the detoxification of cyanide in these waste waters, it has been found that the combination of hydrogen peroxide and formaldehyde when used in certain amounts detoxifies the cyanide efficiently and quickly. To increase the efficient utilization of hydrogen peroxide and/or to aid in the flocculation and settling of basic zinc salts when cyanide zinc electroplating wastes are treated, it is particularly preferred to use a magnesium salt such as Epsom salt (magnesium sulfate heptahydrate) along with the hydrogen peroxide and formaldehyde.

The process of the invention is carried out by adding the treating chemicals to the cyanide-containing water in any order and most conveniently in their commercially available forms. For instance, it is preferred that the hydrogen peroxide, as a 20 to 80 percent aqueous solution commercially available, be added last since it is the most expensive of the chemicals used; however, it can be added first. The term hydrogen peroxide can also mean not only liquid hydrogen peroxide but those perhydrates that release hydrogen peroxide when the perhydrate is placed in water. Perhydrates include alkali metal salt perhydrates such as the sodium perborates such as the monohydrate or tetrahydrate, and sodium or ammonium percarbonate. Also, the magnesium salt can be dissolved in either or both of the formaldehyde or hydrogen peroxide and still give an efficient cyanide destruction. Any particular order of addition can depend on the preference of the end user as the process applies to his particular system. Formaldehyde is commercially available as a 37 percent aqueous solution containing 10 to 15 percent methanol as stabilizer (called formalin). The term formaldehyde can also mean those compounds which when added to water, especially at pH 9 to 12.5, yield formaldehyde. One such compound is paraformaldehyde. The treatment chemicals can be added slugwise at one time or added incrementally, especially when waste waters are being treated continuously. Cyanide in waste waters can also be detoxified by adding the waste waters to a solution of the treatment chemicals.

The combination of hydrogen peroxide and formaldehyde is essential to the process of the present invention. Generally, the hydrogen peroxide is present in amounts such that the initial molar ratio of $H_2O_2/CN^1$ is within the range of about 0.6 to 3, preferably about 0.75 to 1.5, and in most cases a ratio of 0.8 to 1 is adequate. The higher the concentration of $CN^1$, the lower is the initial molar ratio of $H_2O_2/CN^1$ required (along with formaldehyde), but to avoid possible adverse reaction conditions (e.g.,) too high a temperature) when excessive $CN^1$ is present, it will advantageous to add the hydrogen peroxide in increments. When the sodium cyanide concentration is above about 200 p.p.m., an initial molar ratio of under 1.1 will be sufficient when operating at optimum temperatures, i.e., 120° to 150° F. If the cyanide concentration in the waste water is 100 p.p.m. or less, a ratio as high as 1.7 may be needed. The molar ratio needed for complete cyanide destruction can increase to greater than 2 if the temperature is sufficiently low (50° to 100° F.) or the concentration of cyanide is substantially below 100 p.p.m.

Although an initial molar ratio of $H_2O_2/CN^1$ of 0.8 to 1 is adequate in destroying cyanide, hydrogen peroxide is actually consumed more efficiently as indicated by the molar use ratios for hydrogen peroxide after, or while, all cyanide is (being) destroyed. For instance, if the initial molar ratio of $H_2O_2/CN^1$ is 0.98 and the molar use ratio after all cyanide is destroyed is only 0.6 to 0.7, this represents a reservoir of unused hydrogen peroxide potentially available to increase the rate of cyanide destruction if process variables were optimized. Conversely, with optimized process variables, this reservoir can be decreased to get lower chemical costs. Presumably, under optimum process conditions, the initial molar ratio can approach, but not reach, the molar use ratio. Since the average molar use ratio in the examples is about 0.6, it appears that the lower limit for the initial molar ratio of $H_2O_2/CN^1$ is 0.6. There is no upper limit other than that imposed by cost.

Formaldehyde is present in amounts such that the initial molar ratio of $CH_2O/CN^1$ is within the range of about 0.5 to 3, preferably 0.6 to 2, and in many cases a ratio of 0.65 to 0.8 is adequate. It appears as though the higher ratios of formaldehyde to $CN^1$ (over 1) are less effective than lower ratios, where cyanide is destroyed a little more efficiently, except when the cyanide concentration is under 100 p.p.m. At these small cyanide concentrations, higher molar ratios are more effective. Since formaldehyde reacts with hydrogen peroxide, the lower efficiency at the higher ratios is thus attributable to an unneeded excess of formaldehyde. For some unknown reason, formaldehyde is the only carbonyl compound that efficiently destroys cyanide in combination with hydrogen peroxide.

The most preferred combination of treatment chemicals for destroying cyanide employs a magnesium salt along with formaldehyde and hydrogen peroxide. Particularly preferred because of its effectiveness and low cost is magnesium sulfate (Epsom salt). Any magnesium salt or compound of an inorganic or organic acid capable of being converted to magnesium hydroxide is operable in the process, but preferred compounds, other than Epsom salt, are magnesium halides such as magnesium chloride, magnesium carbonate, magnesium oxide, magnesium nitrate and magnesium acetate. The magnesium compound is added in amounts to provide at least 0.3 p.p.m. of $Mg^{++}$, based on the weight of waste water treated. While 20 to 150 p.p.m. of magnesium sulfate (about 2 to 15 p.p.m. $Mg^{++}$) is generally sufficient, there is no upper limit of $Mg^{++}$ concentration, other than cost; thus, depending on the cyanide-containing water to be treated, a $Mg^{++}$ concentration of 500 p.p.m. can be used. A preferred $Mg^{++}$ concentration is about 1 to 100 p.p.m. while a particularly preferred concentration is 2 to 40 p.p.m. The function of the $Mg^{++}$ is not precisely known; however, when zinc electroplating rinse waters are treated, the magnesium salt acts as an aid in the flocculation and settling of zinc salts. Although a magnesium salt should be added as one of the treatment chemicals in the process, the waste water can contain a sufficient concentration of $Mg^{++}$ from earlier contamination by the use of hard water. It is also surprising that other alkaline earth metal salts such as calcium nitrate and other salts such as aluminum sulfate and sodium stannate do not promote the destruction of cyanide by hydrogen peroxide and formaldehyde.

While the temperature for carrying out the process is not especially critical, longer destruction times are encountered at lower temperatures. Thus, a temperature within the range of about 50° to 180° F. should be employed, preferably about 70° to 160° F. with the most preferred temperature range being about 120° to 150° F. It appears that a temperature of about 120° F. is optimum because cyanide destruction is complete within a reasonable time and the molar use ratio of $H_2O_2/CN^1$ is minimal. Temperatures above about 180° F. gives less efficient reactions.

It has also been found that a pH of the waste water treated is important to the rate of cyanide destruction. At a pH of about 13, the cyanide destruction is impractically slow, and at a pH of about 9 the rate is slower than optimum, but operable if a longer reaction time is available; thus the pH should be within the range of about pH 9 to 12.5, preferably about 10 to 12. For most cyanide cadmium or zinc electroplating rinses, the waste waters are already at, or close, to optimum pH; however, if the pH must be adjusted, the adjustment can be easily conducted by adding a base such as sodium hydroxide to raise the pH or adding an acid such as sulfuric acid to lower the pH.

When zinc cyanide plating waste waters are treated according to the process of the present invention, the residual soluble zinc is generally less than 4 p.p.m. zinc. This is due to the flocculation and settling of basic zinc salt (zinc hydroxide and zinc carbonate) precipitates, which as mentioned earlier appear to flocculate and settle with the aid of the magnesium salt. After the waste waters are treated to destroy the cyanide, the basic zinc salts can be separated from the water by any of the usual physical means such as filtration, centrifugation, decanting or settling.

The treatment chemicals can be added to the cyanide waste waters either as solids or water solutions, in continuous increments or batchwise, and in any order, although it is preferred to add hydrogen peroxide last so that it will not decompose before the process reactions begin. While batchwise additions of the chemicals to the waste waters will usually be employed, it is within the scope of the present process to use a chemical rinse, i.e., the cyanide waste waters are added to an aqueous solution of the treatment chemicals, such as would be carried out by an article passing from the zinc electroplating step to the first rinse. In this process, the first rinse would be the aqueous solution of the treatment chemicals which would be maintained at the desired strength by periodic additions of the treatment chemicals.

Since the process is usually practiced by adding small amounts of the treatment chemicals to a large volume of cyanide-containing water, it is important that there be adequate agitation to disperse the treatment chemicals throughout and aid in the dissolution of solid chemicals, if used. Agitation can be carried out by any suitable means such as by air sparging, steam sparging, mechanical stirrers or by pumping.

After treatment according to the process of the present invention, clear waste waters with the cyanide destroyed and the zinc salts removed can be discharged to the sewer. The separated zinc salts can be recycled to the cyanide zinc electroplating step for reuse.

The invention is further illustrated by the following examples in which parts and percentages are by weight unless otherwise indicated:

EXAMPLES 1 to 8

A concentrated cyanide zinc electroplating solution prepared from 396 g. sodium hydroxide, 216 g. of zinc cyanide and 156 g. sodium cyanide dissolved in 3.7 liters of distilled water was added to water to give a rinse having a sodium cyanide concentration of about 505 p.p.m. (517 p.p.m. for examples 4 to 8). For each run, between 500 and 1000 ml. portions of the above cyanide-containing water were added to a glass beaker and then heated in a water bath to 120° F. The first treatment chemical added (if used) was soda ash (sodium carbonate—0.5 M at pH 10) to simulate its presence in plating shop rinses caused by decomposition of sodium and zinc cyanides during electroplating. The other treatment chemicals were added in a slug feed with rapid stirring in the following order and in amounts shown in table I: (a) magnesium sulfate, (b) aqueous solution of formaldehyde containing 37 percent formaldehyde and 10 to 15 percent methanol as stabilizer (formalin) and then (c) a 35 percent hydrogen peroxide solution. Initial pH values in table I were after addition of soda ash (if used) but before other treatment chemicals were added.

After 15 minutes, the concentration (p.p.m.) of cyanide was analyzed by titration with 0.06 N silver nitrate solution by the classical Deniges method and the concentration (p.p.m.) of hydrogen peroxide was determined by standard iodometric methods using 0.01 N sodium thiosulfate. The molar use ratio is the ratio of moles of hydrogen peroxide consumed to moles of $CN^1$ consumed at the time recorded for the last hydrogen peroxide analysis. The results are shown in table I.

Table I shows that formaldehyde along or just with the magnesium sulfate does not efficiently destroy cyanide in a zinc plating rinse, but that hydrogen peroxide is also needed. The table also shows the need for sufficient formaldehyde in combination with hydrogen peroxide, e.g., compare Control (C) having a molar ratio of $CH_2O/CN^1$ of 0.13 in which only 19 percent of the cyanide was destroyed in 90 minutes with examples 2 or 3 in which all cyanide was destroyed in 15 minutes. Finally, the table shows when comparing example 1 with examples 2 or 3 that the cyanide destruction was more efficient when magnesium sulfate was present. After all of the cyanide has been destroyed in example 3 (15 mins.), enough concentrated zinc plating solution and then 35 percent hydrogen peroxide solution was added to give 512 p.p.m. $CN^1$ and 948 p.p.m. hydrogen peroxide (molar ratio of $H_2O_2/CN^1$ =2.67). After standing an additional 15 minutes at 120° F., only 13 percent of the cyanide was destroyed and 75 p.p.m. of hydrogen peroxide had been consumed. The water then containing 441 p.p.m. of $CN^1$ and 873 p.p.m. hydrogen peroxide (molar ratio of $H_2O_2/CN^1=2.85$) was charged with 300μl. of formalin to provide 177 p.p.m. of formaldehyde (molar ratio of $CH_2O/CN^1=0.65$). After standing an additional 15 minutes at 120° F., the cyanide was completely destroyed. This last test shows that hydrogen peroxide and formaldehyde are acting jointly to destroy cyanide.

The results in table III show that an initial molar ratio of $CH_2O/CN^-=0.65$ (example 23) was high enough to permit complete destruction of cyanide within 1 hour and a ratio of 0.55 (examples 24 and 25) was marginal since destruction would have probably been complete in 2 or 3 hours. An initial ratio of 0.40 [Controls (I) and (J)] was too low to permit an efficient complete destruction. The table also shows efficient destruction of cyanide with from 5 to 400 p.p.m. of magnesium sulfate (20 to 100 p.p.m. generally sufficient) and the use of other magnesium compounds and salts as a source of $Mg^{++}$.

TABLE I.—HYDROGEN PEROXIDE AND FORMALDEHYDE TREATMENT OF ZINC CYANIDE RINSE WATERS AT 120° F.

| Example No. | Treatment chemicals, p.p.m. | | | | Initial molar ratios | | Initial pH | Percent cyanide after— | | | p.p.m. $H_2O_2$ left after— (— min.) | Molar use ratio $H_2O_2$ $CN^-$ |
| --- | --- | --- | --- | --- | --- | --- | --- | --- | --- | --- | --- | --- |
| | $CH_2O$ | $H_2O_2$ | $Mg^{++}$ | Soda ash | $CH_2O$ NaCN | $H_2O_2$ NaCN | | 15 min. | 60 min. | 135 min. | | |
| Control (A) | 201 | 0 | | | 0.65 | | 11.5 | 99 | | | | |
| 1 | 201 | 560 | | | 0.65 | 1.60 | 11.6 | 17 | | | 317(15) | 1.09(15) |
| Control (B) | 201 | 0 | 1 50 | 500 | 0.65 | | 11.2 | 97 | | | | |
| 2 | 201 | 349 | 1 10 | 100 | 0.65 | 1.00 | 11.3 | 0 | | | 227(15) | 0.65(15) |
| Control (C) | 40 | 349 | 1 50 | 500 | 0.13 | 1.00 | 11.2 | 2 81 | | | 54(90) | 0.80(90) |
| 3 | 201 | 522 | 1 50 | 500 | 0.65 | 1.48 | 11.4 | 0 | | | 136(15) | 0.39(15) |
| 4 | 210 | 312 | 0 | 500 | 0.65 | 0.85 | 11.5 | | 20.6 | | 30(60) | 1.02(60) |
| 5 | 210 | 312 | 3 140 | 500 | 0.65 | 0.85 | 11.5 | | 0 | | 110(60) | 0.54(60) |
| 6 | 210 | 305 | 0 | 500 | 0.66 | 0.85 | 11.5 | 12.5 | | 12.5 | 22(90) | 0.89(90) |
| 7 | 210 | 305 | 1 400 | 500 | 0.66 | 0.85 | 11.5 | 11.2 | | 4.64 | 143(90) | 0.53(90) |
| 8 | 218 | 305 | 1 100 | 500 | 0.66 | 0.85 | 11.5 | 0.89 | | 0 | 92(90) | 0.60(90) |

1 As $MgSO_4 \cdot 7H_2O$.
2 After 90 minutes.
3 As $Mg(C_2H_3O_2)_2 \cdot 4H_2O$.

EXAMPLES 9 TO 17

To 3,000 ml. of water was added 1.5 g. of sodium cyanide so as to give water having a sodium cyanide concentration of about 500 p.p.m. The runs conducted in these examples used 700 ml. portions of this cyanide-containing water contained in glass beakers and heated by immersion in a water bath. The treatment chemicals were added slugwise with stirring in the following order to give amounts shown in table II: (a) solid soda ash (if used), (b) magnesium sulfate, (c) formalin, or other carbonyl compound, and (d) 35 percent hydrogen peroxide. In examples 15 and 16, the hydrogen peroxide was added before the formalin. The pH was adjusted to the desired level after the addition of soda ash (if used) by using sodium hydroxide to adjust the pH to 11.6 or 13 and sulfuric acid to adjust the pH to 9. After various periods of time, the $CN^1$ concentration and hydrogen peroxide concentration were determined as in examples 1 to 8 except in examples 15 and 16 where the remaining cyanide was analyzed with an "Ionalyzer" Cyanide Ion Activity Electrode Model 94-06 (Orion Research Inc.) by measuring millivolt changes using the "Rel MV" setting on an Orion "Ionalyzer" (Model 801/digital pH meter). The meter was calibrated using solutions of known sodium cyanide concentration. The results are shown in table II.

The results in table II show that the mixture of hydrogen peroxide, formaldehyde and magnesium sulfate had rapidly and efficiently destroyed all of the cyanide in the cyanide-containing water, it making no difference whether the formaldehyde or hydrogen peroxide was added first. The results also show the marked superiority of formaldehyde over other carbonyl compounds when used with hydrogen peroxide in the detoxification of cyanide. When cyanide zinc plating solution was treated with other carbonyl compounds, the superiority of formaldehyde was more clearly apparent. Also, the results show that soda ash had no appreciable effect on a cyanide destruction system based on hydrogen peroxide and formaldehyde. Finally, the results also show that the cyanide destruction rate was faster at pH 10.4 than at pH 11.6 and that the cyanide destruction rate at pH 13 was impractically slow.

EXAMPLES 18 TO 38

Using the cyanide zinc electroplating solution and procedures described in examples 1 to 3, portions of the solution were added to water in a beaker to give 500 ml. of waste water having the desired cyanide concentration. The results are shown in table III.

On the other hand, metal salts similar to magnesium salts (sources of $Ca^{++}$, $Al^{+++}$ and stannate) do not aid in the efficient destruction of cyanide. Here again, Control (M) shows that a pH of 13 was impractically slow and a pH of 9 tended to give a reaction on the slow side. Finally, the results show that a temperature range of about 120° to 150° F. is optimum.

EXAMPLES 39 TO 36

Samples of cyanide zinc and cadmium electroplating solutions were taken from commercial plating shops where the plating bath had been in operation for a substantial period of time. Although the exact bath compositions were unknown, the cyanide concentration was determined by the procedure mentioned in examples 1 to 3, and these concentrations are set forth in table IV. The cyanide destruction procedures and chemicals of examples 1 to 3 were used, except for Control (N) and example 41 in which a solution containing 35 percent hydrogen peroxide and 8 percent Epsom salt was used, and the results are shown in table IV.

The results in table IV show that cyanide from commercial zinc and cadmium plating solutions is easily destroyed using the preferred hydrogen peroxide, formaldehyde and magnesium sulfate system of the present invention.

EXAMPLE 42

This example shows that the basic zinc compounds such as zinc hydroxide and zinc carbonate that precipitate from a zinc plating rinse treated with the preferred hydrogen peroxide, formaldehyde and magnesium sulfate system can be separated by filtration to leave a low concentration of zinc in the filtrate.

To a polyethylene tank (12 inches × 18 inches × 17 inches deep) filled with 57 liters of tap water at about 120° F. was added 355 ml. of the concentrated zinc plating solution described in examples 1 to 8 to give about 576 p.p.m. cyanide and 28.5 g. of soda ash to give a concentration of 500 p.p.m. The pH was 10.5. The temperature was maintained at about 118° F. with a 1,000 watt thermostated immersion heater and the solution was stirred to give a gentle turbulence. The reactants were added slugwise in the following order: 2.85 g. of magnesium sulfate to provide 50 p.p.m. of $MgSO_4 \cdot 7H_2O$, 30 ml. of formalin to provide 210 p.p.m. of formaldehyde and 43 ml. of 35 percent hydrogen peroxide to give 309 p.p.m. of hydrogen peroxide. After 60 minutes, there was no cyanide remaining in the solution as indicated with the Orion cyanide electrode. The reaction mixture was then pumped with a 1/30 HP centrifugal pump from an outlet at the bottom of the tank

TABLE II.—HYDROGEN PEROXIDE AND CARBONYL COMPOUNDS TO TREAT SODIUM CYANIDE RINSE WATER

| Example No. | Treatment Chemicals, p.p.m. | | | | | Initial molar ratios | | Temp., °F. | Initial pH | Percent CN⁻ left after— | | | p.p.m. H₂O₂ left after— | | | Molar use ratio |
|---|---|---|---|---|---|---|---|---|---|---|---|---|---|---|---|---|
| | H₂O₂ | Carbonyl Name | p.p.m. | MgSO₄ | Soda ash | H₂O₂/CN⁻ | Carbonyl/CN⁻ | | | 15 Min. | 30 Min. | (−) Min. | 15 Min. | 30 Min. | (−) Min. | |
| Control (D) | 295 | | | | | 0.84 | | 100 | 11.6 | | 93.1 | 84.2 (120) | | 280 | 246 (120) | 0.88 |
| 9 | 295 | CH₂O | | 100 | | 0.84 | 0.65 | 100 | 11.6 | | 23.3 | 1.2 (120) | | 223 | 120 (120) | 0.50 |
| 10 | 295 | CH₂O | 200 | 100 | | 0.84 | 0.56 | 100 | 11.6 | | 29.8 | 6.9 (120) | | 222 | 139 (120) | 0.53 |
| Control (E) | 355 | Benzaldehyde | 175 | | 500 | 1.0 | 0.71 | 100 | 11.6 | | 94.7 | 90.1 (120) | | 336 | 282 (100) | 0.48 |
| Control (F) | 355 | Acetone | 777 | | 500 | 1.0 | 0.71 | 120 | 11.6 | | 96.4 | 95.3 (100) | | 356 | 343 (100) | 2.11 |
| Control (G) | 355 | Acetaldehyde | 425 | | 500 | 1.0 | 0.71 | 120 | 11.6 | | 86.2 | 82.4 (100) | | 202 | 126 (100) | 0.71 |
| 11 | 355 | CH₂O | 322 | | | 1.0 | 0.64 | 120 | 11.6 | 37.1 | 39.7 | 20.9 (60) | | 143 | 124 (60) | 3.70 |
| 12 | 355 | CH₂O | 200 | 0 | 500 | 1.0 | 0.64 | 120 | 11.6 | 40.7 | 32.6 | 22.1 (60) | | 184 | 162 (60) | 1.09 |
| 13 | 348 | CH₂O | 200 | 0 | 0 | 1.0 | 0.64 | 120 | 11.6 | 40.7 | 32.8 | 22.1 (60) | | 263 | 239 (60) | 0.82 |
| 14 | 348 | CH₂O | 400 | 100 | 0 | 1.0 | 1.30 | 120 | 10.4 | 1.2 | 1.2 | 0 (60) | | 131 | | 0.39 |
| 15 | 348 | CH₂O | 300 | 80 | 0 | 1.0 | 0.98 | 120 | 10.4 | 9.4 | | 0 (60) | | 160 | | 0.62 |
| 16 | 348 | CH₂O | 200 | 80 | 0 | 1.0 | 0.65 | 120 | 10.4 | 9.4 | 1.2 | | | 179 | | 0.55 |
| Control (H) | 348 | CH₂O | 300 | 80 | 500 | 1.0 | 0.98 | 120 | 13 | 92.2 | 60.4 (60) | | | 241 | | 0.49 |
| 17 | 348 | CH₂O | 300 | 80 | 500 | 1.0 | 0.98 | 120 | 9.0 | 21.3 | 9.4 | 10.6 (61) | | 194 | | 0.78 |

TABLE III.—HYDROGEN PEROXIDE AND FORMALDEHYDE TO TREAT ZINC CYANIDE RINSE WATERS

| Example No. | CN⁻, p.p.m. | Treatment chemicals, p.p.m. | | | | | Initial molar ratios | | | Temp., °F. | Initial pH | Percent CN⁻ left after— | | | p.p.m. H₂O₂ left after— | | | Molar use ratio |
|---|---|---|---|---|---|---|---|---|---|---|---|---|---|---|---|---|---|---|
| | | H₂O₂ | CH₂O | Metal salt Name | p.p.m. | Soda ash | H₂O₂/CN⁻ | CH₂O/CN⁻ | | | | 15 min. | 30 min. | (−) min. | 15 min. | 30 min. | (−) min. | |
| 18 | 486 | 281 | 211 | MgSO₄ | 50 | 200 | 0.83 | 0.71 | | 119 | 11.7 | 24.3 | 16.6 | 5.1 (60) | 75 | 49 | | 0.81 |
| 19 | 486 | 281 | 211 | MgSO₄ | 20 | 200 | 0.83 | 0.71 | | 119 | 11.7 | 9.6 | 1.2 | 1.0 (60) | 125 | 111 | | 0.51 |
| 20 | 486 | 281 | 211 | MgCl₂ | 50 | 200 | 0.83 | 0.71 | | 119 | 11.7 | 10.9 | 1.2 | 1.0 (60) | 125 | 106 | | 0.53 |
| 21 | 486 | 281 | 211 | MgSO₄ | 200 | 200 | 0.76 | 0.65 | | 120 | 11.7 | 9.7 | 1.2 | 1.0 (60) | 131 | 107 | | 0.52 |
| 22 | 535 | 281 | 211 | MgSO₄ | 50 | 200 | 0.76 | 0.40 | | 120 | 11.7 | 10.3 | 1.7 | 0.84 (60) | 92 | 128 | | 0.59 |
| 23 | 535 | 281 | 211 | MgSO₄ | 400 | 200 | 0.76 | 0.40 | | 120 | 11.7 | 17.6 | 7.7 | 1.0 (60) | 177 | 71 | | 0.46 |
| Control (I) | 539 | 300 | 128 | MgSO₄ | 50 | 200 | 0.80 | 0.55 | | 120 | 11.7 | 31.4 | | 10.2 (180) | 181 | 112 (60) | | 0.47 |
| 24 | 539 | 300 | 178 | MgSO₄ | 400 | 200 | 0.80 | 0.55 | | 120 | 11.7 | 28.6 | 4.4 | 19.3 (180) | 181 | 62 | | 0.46 |
| 25 | 527 | 292 | 178 | MgSO₄ | 50 | 200 | 0.80 | 0.55 | | 120 | 11.7 | 17.5 | 0.76 | 1.2 (120) | 125 | 141 (180) | | 0.56 |
| 26 | 534 | 291 | 222 | Al₂(SO₄)₃ | 400 | 200 | 0.79 | 0.68 | | 120 | 11.7 | 19.9 | 12.9 | 10.38 (120) | 77 | 141 (180) | | 0.66 |
| Control (K) | 534 | 291 | 222 | Mg(OH)₂ | | 200 | 0.79 | 0.68 | | 120 | 11.7 | 21.3 | 15.4 | 6.4 (60) | 60 | 92 (120) | | 0.71 |
| 27 | 534 | 291 | 222 | Na₂SiO₃·3H₂O | 50 | 200 | 0.79 | 0.68 | | 120 | 11.7 | 19.9 | 12.4 | 9.76 (60) | 72 | 77 (120) | | 0.71 |
| Control (L) | 534 | 291 | 222 | MgSO₄ | 250 | 200 | 0.79 | 0.68 | | 120 | 11.7 | 28.7 | 18 | 13.9 (60) | 65 | 43 (60) | | 0.77 |
| 28 | 540 | 291 | 222 | MgCO₃ | 50 | 200 | 0.78 | 0.67 | | 120 | 11.7 | 12.7 | 3.7 | 0.6 (60) | 107 | 34 (60) | | 0.55 |
| 29 | 540 | 291 | 222 | MgO | 200 | 200 | 0.78 | 0.67 | | 120 | 11.7 | 15.9 | 9.1 | 0.56 (95) | 101 | 86 (60) | | 0.62 |
| 30 | 540 | 291 | 222 | Ca(NO₃)₂ | 100 | 200 | 0.78 | 0.67 | | 120 | 11.7 | 17.8 | 8.5 | 0.46 (95) | 102 | 61 (95) | | 0.63 |
| 31 | 540 | 291 | 222 | MgSO₄ | 80 | 300 | 0.78 | 0.67 | | 120 | 11.7 | 27.2 | 20.2 | 6.9 (95) | 65 | 56 (95) | | 0.83 |
| Control (M) | 506 | 351 | 300 | MgSO₄ | 80 | 500 | 1.0 | 0.97 | | 120 | 13 | 90.3 | 57.5 | | 194 | 20 (95) | | 0.78 |
| 32 | 506 | 351 | 300 | MgSO₄ | 80 | 500 | 1.0 | 0.97 | | 120 | 9.0 | 26.7 | 15.0 | 10.5 (61) | 189 | 51 | | 1.05 |
| 33 | 495 | 309 | 220 | MgSO₄ | 15 | 300 | 0.9 | 0.73 | | 120 | 11.7 | 9.5 | <0.2 | 1.0 (120) | 109 | 107 | | 0.54 |
| 34 | 495 | 309 | 220 | MgSO₄ | 5 | 300 | 0.9 | 0.73 | | 120 | 11.7 | 12.5 | 1<0.2 | 10.46 (120) | 97 | 71 | | 0.63 |
| 35 | 495 | 309 | 220 | MgSO₄ | 71 | 300 | 0.9 | 0.73 | | 160 | 11.7 | | 12.8 | | 117 | 77 (75) | | 0.68 |
| 36 | 529 | 330 | 321 | MgSO₄ | 75 | 300 | 0.9 | 0.99 | | 160 | 11.7 | | 1.0 | 0.6 (60) | 18 | 105 (60) | | 0.59 |
| 37 | 500 | 295 | 200 | MgSO₄ | 67 | 300 | 0.85 | 0.65 | | 182 | 11.7 | 7.0 | 1.0 | 0 (45) | 41 | 94 (75) | | 0.85 |
| 38 | 500 | 295 | 200 | MgSO₄ | 67 | 300 | 0.85 | 0.65 | | | 11.7 | 13.2 | 10.2 | 1.6 (61) | 124 | 84 (45) | | 0.61 |

¹ Determined by Orion cyanide ion specific electrode.

TABLE IV.—HYDROGEN PEROXIDE AND FORMALDEHYDE TREATMENT OF COMMERCIAL CYANIDE ZINC AND CADMIUM PLATING WASTES

| Example No. | Plating bath | CN⁻, p.p.m. | Treatment chemicals, p.p.m. | | | | Initial molar ratios | | | Temp., °F. | Initial pH | Percent CN⁻ left after— | | | p.p.m. H₂O₂ left after— | | | Molar use ratio (min.) |
|---|---|---|---|---|---|---|---|---|---|---|---|---|---|---|---|---|---|---|
| | | | H₂O₂ | CH₂O | Epsom salt | | H₂O/CN | CH₂O/CN | | | | 15 min. | 30 min. | (−) min. | 15 min. | 30 min. | (−) min. | |
| 39 | Zn | 100 | 101 | 42 | 50 | | 1.46 | 0.69 | | 131,132 | 11.3 | 12 | 0 | | 80 | 75 | | 0.37 |
| 40 | Zn | 783 | 461 | 465 | 100 | | 0.85 | 0.97 | | 120 | 11.9 | 1.8 | 0 | | 65 | 46 | | 0.76 |
| Control (N) | Cd | 629 | 437 | | | | 1.0 | | | 120 | 10.2 | 76.0 | | 67.7 (45) | 388 | 362 | 337 (45) | 0.71 |
| 41 | Cd | 629 | 437 | 260 | 100 | | 1.0 | 0.65 | | 120 | 10.8 | | | 1.6 (45) | 143 | 79 | 41 (45) | 0.67 | through a Sethco filter assembly holding a No. 5 polypropylene Sethco filter tube (6 inches × 2.5 inches) having a Sethco designation 5 Poly Spec B Comp PP (pore size 1-3 microns). The initial zinc concentration before treatment was 206 p.p.m. as calculated from solution makeup and after 6 minutes of filtering the filtrate contained only 2.08 p.p.m. of zinc. The filtered zinc salts were suitable to be returned to make up the cyanide zinc electroplating solution.

EXAMPLES 43 to 45

Using the cyanide zinc electroplating solution and procedures described in examples 4 to 8, portions of the solution were added to water in a beaker to give 500 ml. of water having 517 p.p.m. sodium cyanide. The cyanide destruction reactions were run at 120° F., and the treatment chemicals were added sequentially with vigorous stirring in the order from left to right in table V.

TABLE V

| Example No.: | $MgSO_4 \cdot 7H_2O$, p.p.m. | Formaldehyde, p.p.m. | Active $O_2$, p.p.m. |
|---|---|---|---|
| 43 | 74, pre-dissolved in $H_2O_2$ (8%) | 250 of paraformaldehyde | 151 from 35% $H_2O_2$. |
| 44 | 74, 7.4% aqueous solution | 250 from Formalin | 146 from $NaBO_3 \cdot 4H_2O$. |
| 45 | do | 250 of paraformaldehyde | Do. |

In examples 43 and 44, cyanide destruction was complete in 30 minutes and in example 45, in 45 minutes as determined by the Orion specific ion electrode reading.

These examples show that solid forms of hydrogen peroxide, such as sodium perborate can be used in place of the hydrogen peroxide and that a solid form of formaldehyde such as paraformaldehyde can be used in place of the liquid formalin. By using all solid treatment chemicals, they can be added to the waste water as a dry blend or as briquettes.

We claim:

1. A process for detoxifying cyanide anions contained in water comprising: (1) forming a solution of the cyanide-containing water with hydrogen peroxide and formaldehyde, said hydrogen peroxide being present in an amount so as to provide an initial molar ratio of hydrogen peroxide to cyanide anions within the range of about 0.6 to 3 and said formaldehyde being present in an amount so as to provide an initial molar ratio of formaldehyde to cyanide anions within the range of about 0.5 to 3; (2) reacting said hydrogen peroxide and formaldehyde with said cyanide anions at a temperature within the range of about 50° to 180° F. and at a pH within the range of about 9 to 12.5 for a time sufficient to detoxify the cyanide anions; and (3) discharging the cyanide-detoxified water.

2. The process of claim 1 wherein a magnesium compound is additionally present in said cyanide-containing water in an amount to provide at least about 0.3 p.p.m. of $Mg^{++}$ based on the weight of water.

3. The process of claim 2 wherein the hydrogen peroxide, formaldehyde and magnesium salt are added to the cyanide-containing water, the magnesium salt added as either a solution of magnesium salt in hydrogen peroxide or a solution of magnesium salt in formaldehyde, or as a solution of magnesium salt in both the hydrogen peroxide and formaldehyde.

4. The process of claim 2 wherein the initial molar ratio of $H_2O_2/CN^1$ is within the range of about 0.75 to 1.5.

5. The process of claim 4 wherein the initial molar ratio of $CH_2O/CN^1$ is within the range of 0.6 to 2.

6. The process of claim 5 wherein the magnesium salt is present so as to provide about 1 to 100 p.p.m. of $Mg^{++}$.

7. The process of claim 6 wherein the magnesium compound is selected from the group consisting of magnesium sulfate, magnesium halides, magnesium oxide, magnesium nitrate, magnesium acetate and magnesium carbonate.

8. The process of claim 7 wherein the temperature is within the range of about 70° to 160° F. and the pH is within the range of about 10 to 12.

9. The process of claim 1 wherein the cyanide-anion-containing waste water is cyanide zinc electroplating rinse water.

10. The process of claim 2 wherein at least one of hydrogen peroxide, formaldehyde and magnesium salt is added to the cyanide-containing water incrementally.

11. A process for detoxifying cyanide anions contained in cyanide zinc electroplating rinse waters comprising: (1) adding to the cyanide anion containing water with agitation hydrogen peroxide, formaldehyde and a magnesium compound, said hydrogen peroxide added in an amount so as to provide an initial molar ratio of $H_2O_2/CN^1$ within the range of about 0.6 to 3, said formaldehyde added in an amount so as to provide an initial molar ratio of $H_2CO/CN^1$ within the range of about 0.5 to 3 and said magnesium compound added in an amount so as to provide at least about 0.3 p.p.m. of $Mg^{++}$, based on the weight of waste water; (2) reacting said hydrogen peroxide and formaldehyde with said cyanide anions at a temperature within the range of about 50° to 180° F. and at a pH within the range of about 9 to 12.5 for a time sufficient to detoxify the cyanide anions; (3) separating the basic zinc salts from the treated rinse water; and (4) discharging the cyanide-detoxified rinse water.

12. The process of claim 11 wherein the initial molar ratio of $H_2O_2/CN^1$ is within the range of about 0.75 to 1.5 and the initial molar ratio of $CH_2O/CN^1$ is within the range of about 0.6 to 2.

13. The process of claim 12 wherein the magnesium salt is selected from the group consisting of magnesium sulfate, magnesium halide, magnesium nitrate and magnesium carbonate and is added in an amount so as to provide about 1 to 100 p.p.m. of $Mg^{++}$.

14. The process of claim 13 wherein the temperature is within the range of about 70° to 160° F. and the pH is within the range of about 10 to 12.

15. The process of claim 14 wherein the separated zinc salts are recycled to a cyanide zinc electroplating bath.

16. The process of claim 11 wherein the separated zinc salts are recycled to a cyanide zinc electroplating bath.

* * * * *